United States Patent
Kim

(10) Patent No.: US 7,373,540 B2
(45) Date of Patent: May 13, 2008

(54) SYSTEM-ON-CHIP HAVING ADJUSTABLE VOLTAGE LEVEL AND METHOD FOR THE SAME

(75) Inventor: Jin-Sung Kim, Suwon-si (KR)

(73) Assignee: Samsung Electronics Co. Ltd., Gyeonggi-Do (KR)

( * ) Notice: Subject to any disclaimer, the term of this patent is extended or adjusted under 35 U.S.C. 154(b) by 113 days.

(21) Appl. No.: 11/355,001

(22) Filed: Feb. 16, 2006

(65) Prior Publication Data

US 2006/0190755 A1 Aug. 24, 2006

(30) Foreign Application Priority Data

Feb. 23, 2005 (KR) .................. 10-2005-0015034

(51) Int. Cl.
*G06F 1/00* (2006.01)
(52) U.S. Cl. .................. 713/500; 713/400; 326/93
(58) Field of Classification Search ............ 326/93, 326/38; 713/340, 500, 503
See application file for complete search history.

(56) References Cited

U.S. PATENT DOCUMENTS

| | | | |
|---|---|---|---|
| 5,710,910 A | 1/1998 | Kehl et al. | |
| 6,323,714 B1 | 11/2001 | Naffziger et al. | |
| 7,142,996 B2 * | 11/2006 | Patel et al. | .................. 702/64 |
| 2003/0168915 A1 | 9/2003 | Zhang et al. | |
| 2004/0027160 A1 | 2/2004 | Joshi et al. | |
| 2004/0120087 A1 | 6/2004 | Ishii | |

OTHER PUBLICATIONS

Proceedings of the 17th International Conference on VLSI Design, 2004, R. Sridhar, "System-on-chip (SoC): clocking and synchronization isues", pp. 520-527.
Patents Act 1977: Search Report under Section 17.

* cited by examiner

*Primary Examiner*—Don Le
(74) *Attorney, Agent, or Firm*—Harness, Dickey & Pierce, P.L.C.

(57) ABSTRACT

A system-on-chip may include a plurality of power domains each of which may have a different operating frequency and include a monitoring unit. A power supply may supply power to each of the power domains. A clock generator may output a reference clock to each of the monitoring units. A controller may set a target operating frequency in response to a target frequency set, control the clock generator to generate a reference clock corresponding to the target operating frequency, and generate a control signal for adjusting voltage levels of the power domains based on operating status information from the monitoring units.

23 Claims, 5 Drawing Sheets

SYSTEM-ON-CHIP HAVING ADJUSTABLE VOLTAGE LEVEL AND METHOD FOR THE SAME

PRIORITY STATEMENT

This non-provisional patent application claims priority under 35 U.S.C. § 119 to Korean patent application serial no. 10-2005-0015034, filed Feb. 23, 2005 in the Korean Intellectual Property Office (KIPO), the entire contents of which are incorporated herein by reference.

BACKGROUND

1. Field of the Invention

Example embodiments of the present invention relate to a system-on-chip, which may include a plurality of power domains, for example, a system-on-chip capable of adjusting a voltage level and a method for the same.

2. Description of the Related Art

With higher integration, larger numbers of transistors may be formed in smaller areas and plurality of IP (intellectual property) blocks may be integrated into a single chip.

However, performance of an entire chip may be determined by the IP block with a critical performance because various IP blocks used in designing a system-on-chip may have different performances. In addition, or alternatively, power consumption may be not reduced or significantly reduced even though higher performance IP blocks performance may run at a lower frequency (e.g., a frequency lower than a maximum operating frequency). This may result in inefficient use of power (e.g., power may be wasted).

In one example, if the chip including a plurality of IP blocks has one power domain, a target frequency may be set to an operating frequency of the IP block with the worst performance (e.g., a critical operating frequency). Consequently, other IP blocks may operate at lower speeds (e.g., speeds lower than a maximum speed).

When the IP blocks with various performances are integrated into one system-on-chip, it may be necessary to consider the performance difference between the IP blocks or modules in the IP blocks so as to improve and/or optimize the performance of an entire chip and its power consumption.

SUMMARY OF THE INVENTION

One or more example embodiments of the present invention provide a system-on-chip capable of adjusting a voltage level in power domains with a different operating frequency and methods for the same.

In at least one example embodiment of the present invention, a system-on-chip may include a plurality of power domains, each of which may have a different operating frequency and may include a monitoring unit. The monitoring unit may monitor an operating status of the power domain. A power supply may supply power to each of the power domains, and a clock generator may generate and output a reference clock to each of the monitoring units. A controller may set a target operating frequency in response to a target set signal for setting the target operating frequency, control the clock generator to generate and output a reference clock corresponding to the target operating frequency, and send a control signal for adjusting voltage levels of the power domains to the power supply based on t operating status information received from the monitoring units.

In at least some example embodiments of the present invention, each power domain may include a sub-clock. Each sub-block may include at least one module or IP (intellectual property) block.

In at least some example embodiments of the present invention, the control signal may be indicative of a voltage level selected by the controller based on operating status information.

In at least some example embodiments of the present invention, the power supply may supply each of the power domains with power according to the voltage level selected by the controller.

In another example embodiment of the present invention, a system-on-chip may include at least one IP block. The at least one IP block may include a plurality of power domains each having a different operating frequency, at least one module and a monitoring unit. Each monitoring unit may monitor an operating status of at least one corresponding module. A power supply may supply power to each of the power domains, and a clock generator may generate and output a reference clock to each of the monitoring units. A controller may set a target operating frequency based on a target set signal for setting the target operating frequency, control the clock generator to generate a reference clock corresponding to the target operating frequency, and send a control signal for adjusting voltage levels of the power domains to the power supply based on operating status information associated with the modules, wherein the operating status information for the modules is received from the monitoring units.

In another example embodiment of the present invention, a system-on-chip may include a plurality of power domains each having a different operating frequency, at least one IP block and a monitoring unit. The monitoring unit may monitor an operating status of the at least one IP block. A power supply may supply power to each of the power domains, and a clock generator for may generate and output a reference clock to each of the monitoring units. A controller may set a target operating frequency based on a target set signal for setting the target operating frequency, control the clock generator to generate a reference clock corresponding to the target operating frequency and send a control signal for adjusting voltage levels of the power domains to the power supply based on operating status information for the IP blocks received from the monitoring units.

In another example embodiment of the present invention, a system-on-chip may include at least one IP block. The at least one IP block may include a plurality of first power domains each having a different operating frequency, a sub-block and a monitoring unit for monitoring an operation status of the sub-block. The system-on-chip may also include a plurality of second power domains, each having a different operating frequency, at least one IP block and a monitoring unit for monitoring an operation status of the at least one IP block. A power supply may supply power to the first and second power domains, and a clock generator may generate and output a reference clock to each of the monitoring units in the first and second power domains. A controller may set a target operating frequency in response to a target set signal for setting the target operating frequency, control the clock generator to generate a reference clock corresponding to the target operating frequency and send a control signal for adjusting voltage levels of the power domains to the power supply based on operating status information for the sub-blocks and/or IP blocks received from the monitoring units.

In at least some example embodiments of the present invention, the sub-block may include at least one module.

In at least some example embodiments of the present invention, the monitoring units may obtain operating status information by comparing a frequency of the reference clock with the operating frequency of a sub-block, module and/or IP block.

In another example embodiment of the present invention, a reference clock may be generated according to a target operating frequency. A frequency of the reference clock may be compared with an operating frequency of an IP block and/or a sub-block in a power domain to generate a comparison result. A voltage level may be selected based on the comparison result. Each of the power domains may be supplied with power according to the selected voltage level, whether the power domain is supplied with an appropriate voltage level may be determined.

In at least some example embodiments of the present invention, the comparing, the selecting and the supplying may be repeated if an appropriate voltage level is not supplied.

BRIEF DESCRIPTION OF THE DRAWINGS

The present invention will be described with regard to the accompanying drawings, which illustrate example embodiments of the present invention. These example embodiments are included to provide a complete understanding of the present invention, and not to limit its scope. In the drawings.

DETAILED DESCRIPTION OF EXAMPLE EMBODIMENTS OF THE PRESENT INVENTION

Figure 1:
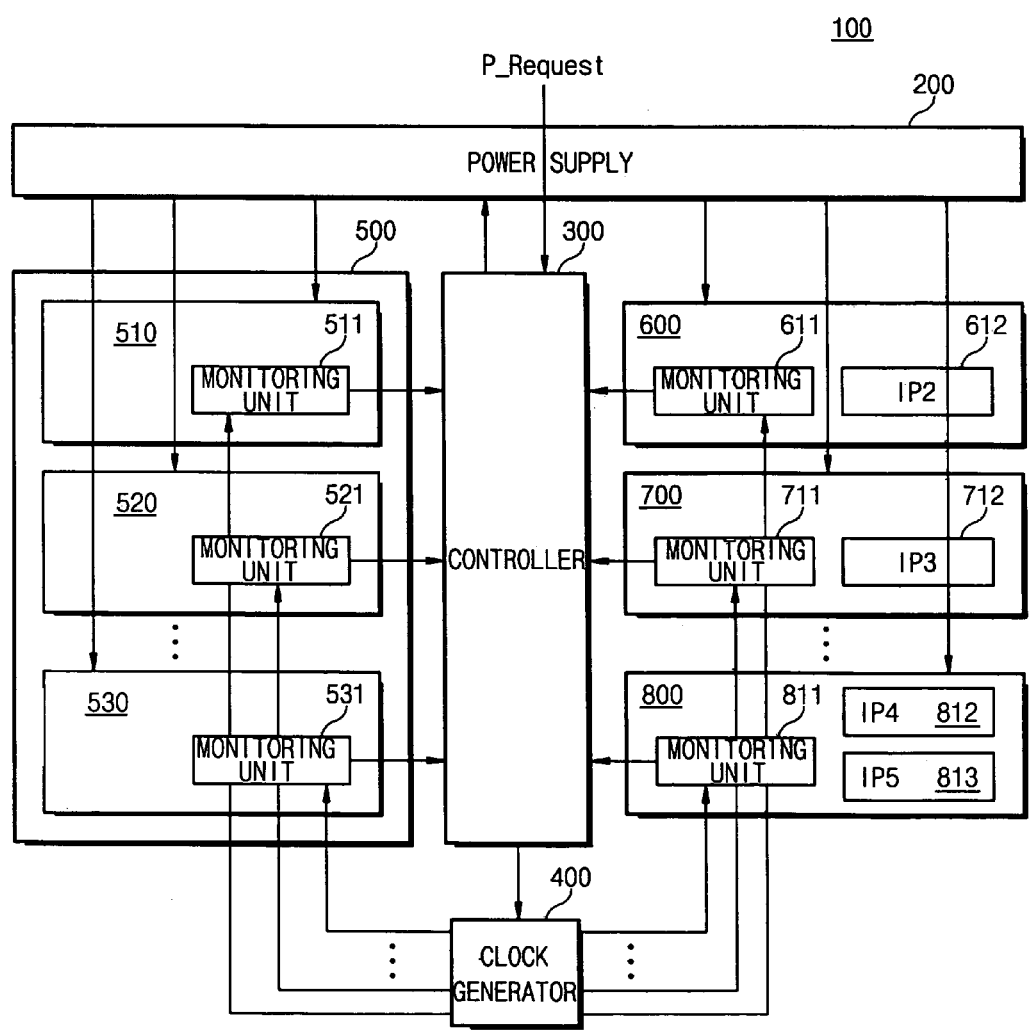
FIG. 1 is a block diagram of a system-on-chip according to an example embodiment of the present invention.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

At least one example embodiment of the present invention may utilize or be utilized in conjunction with a dynamic voltage scaling (DVS) method, and may resolve a problem of the frequency difference between IP blocks or sub-blocks of differing performance in the IP blocks.

DVS may improve and/or optimize performance and/or power consumption based on the fact that a voltage level of the IP block may be proportional to the performance and/or inversely proportional to the power consumption. For example, in terms of the power consumption, an operating current may be proportional to the square of the voltage level and/or a leakage current may be proportional to the cube of the voltage level. Thus, the power consumption may be reduced using the DVS, or any other suitable method.

FIG. 1 is a block diagram of a system-on-chip according to an example embodiment of the present invention. As shown, a system-on-chip 100 may include a power supply 200, a controller 300, a clock generator 400, an IP block 500, power domains 600, 700, and/or 800.

The power supply 200 may supply power to the IP block 500 and the power domains 600, 700 and 800. The IP block 500 may include a plurality of power domains 510, 520 and 530. The power domains 510, 520 and/or 530 may include monitoring units 511, 521 and 531 for monitoring their operating speed and/or operating frequency, respectively. In at least this example embodiment, the IP block 500 may include a plurality of modules with differing performance and/or operating frequencies, and each of the power domains 510, 520 and 530 may include modules with similar or substantially similar operating frequencies.

The power domains 600, 700 and 800 may include monitoring units 611, 711 and 811, respectively. The power domains 600 and 700 may include IP blocks 612 and 712, respectively, and the power domain 800 may include IP blocks 812 and 813. In at least this example embodiment, the IP blocks 612, 712, 812 and 813 may include respective sub-blocks (not shown) with similar or substantially similar operating frequencies and the IP blocks 812 and 813 may have similar or substantially similar operating frequencies. For example, the sub-block of the IP blocks 612, 712, 812 and/or 813 may include one or more inner module.

The controller 300 may control the power supply 200, the clock generator 400, and the monitoring units 511, 521, 531, 611, 711 and 811 and/or the IP block 500 in response to an external signal P_Request input by a user. The external signal P_Request may include information on a target operating frequency of the system-on-chip 100, and so on.

Figure 5:
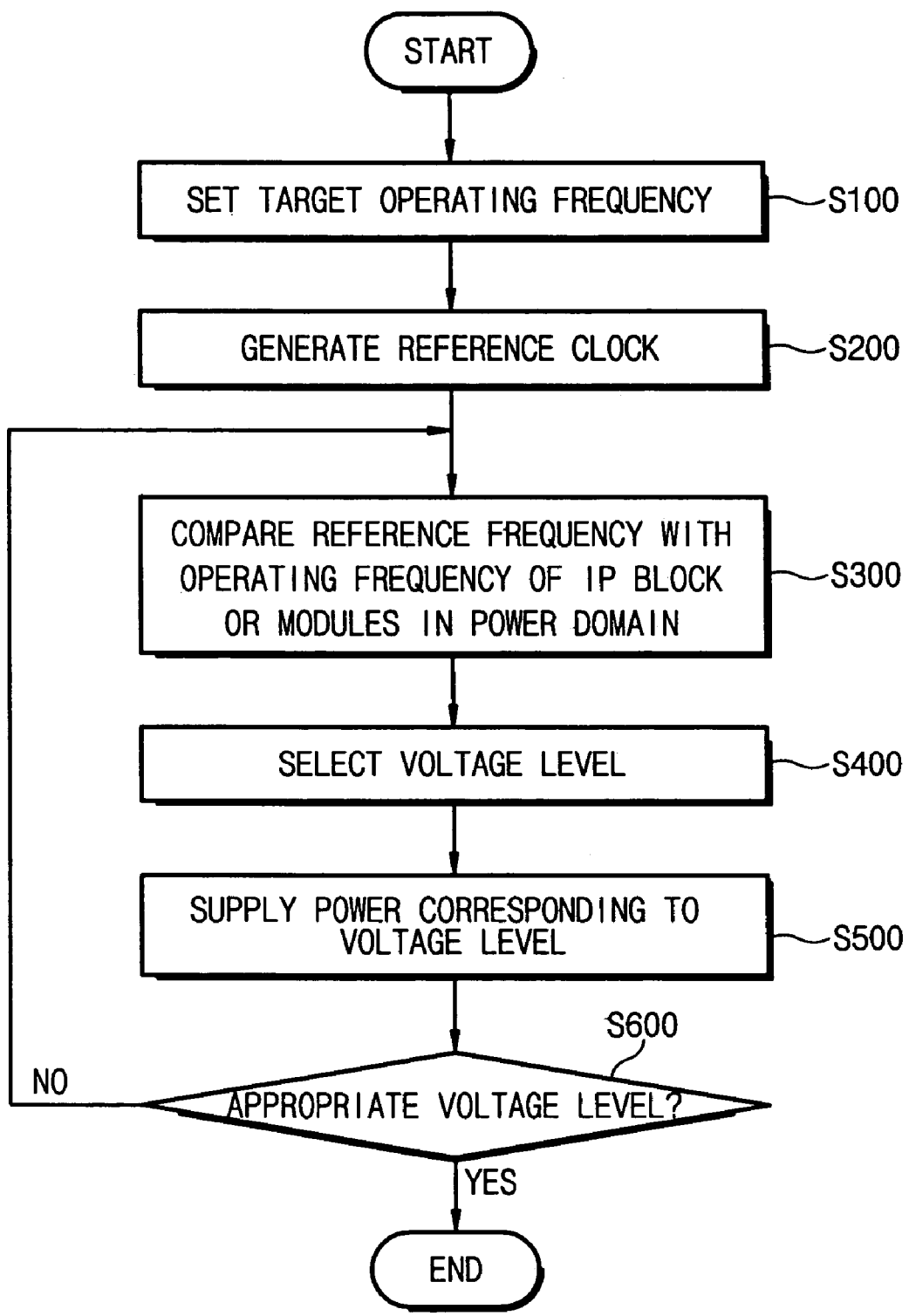
FIG. 5 is a flow chart illustrating a method of adjusting a voltage level according to an example embodiment of the present invention.

FIG. 5 is a flowchart diagram illustrating a method for adjusting a voltage level according to an example embodiment of the present invention. Referring to FIGS. 1 and 5, the controller 300 may set the target operating frequency according to the external signal P_Request and may send information on the target operating frequency to the clock generator 400 (S100).

The clock generator 400 may generate a reference clock corresponding to the target operating frequency under control of the controller 300 and may supply the reference clock to each of the monitoring units 511, 521, 531, 611, 711 and 811 of the IP block 500 and the power domains 600, 700 and 800 (S200). Two or more reference clocks may be used to more accurately control the voltage level of each power domain.

Each of the monitoring units 511, 521, 531, 611, 711 and 811 in the power domains 510, 520, 530, 600, 700 and 800 may compare the reference clock frequency with the clock frequency of the modules or the IP block in each power domain, and may send the corresponding information to the controller 300 (S300).

The controller 300 may include information on a critical path of the module or the IP block in each power domain. Depending on the comparison information from the monitoring units, the controller 300 may select a voltage level to be supplied to each of the power domains 510, 520, 530, 600, 700 and 800 (S400). In consideration of the reference clock frequency (e.g., the target operating frequency set by a user), power may be more excessively consumed when the supplied voltage level is higher. In consideration of the reference clock frequency, the IP blocks 612, 712, 812 and 813 or the modules (not shown) in the power domains may not operate normally when the supplied voltage level is lower. In these examples, the controller 300 may provide the power supply 200 with a control signal for allowing the power supply 200 to select a voltage level and generate a corresponding power.

For example, when the voltage level supplied to the power domain 600 by the power supply 200 is lower the monitoring unit 611 may send the corresponding information to the controller 300 (S400). The controller 300 may compare the information from the monitoring unit 611 of the power domain 600 with the reference value stored in a storage device (e.g. an internal register) and may determine how high to raise the voltage level. The controller 300 may send a control signal for raising the voltage level to the power supply 200.

The power supply 200 may raise the voltage level in response to the control signal, and may supply the increased voltage level to the power domain 600 (S500). The monitoring unit 611 may (e.g., again) monitor the performance of the IP block 612 with respect to the supplied voltage level and may send the corresponding information to the controller 300. The controller 300 may determine whether the IP block 612 in the power domain 600 is operating at an appropriate frequency without unnecessarily wasting power and/or performance degradation (S600).

At least one example embodiment of the present invention may provide an improved and/or optimal voltage level corresponding to the reference clock frequency requested by a user in each of the power domains 510, 520, 530, 600, 700 and 800. Thus, performances of the IP blocks 612, 712, 812 and 813 or modules with lower performance and/or operating frequency may be improved and/or enhanced. The IP blocks or modules with higher performance may reduce their power consumption in one system-on-chip.

Figure 2:
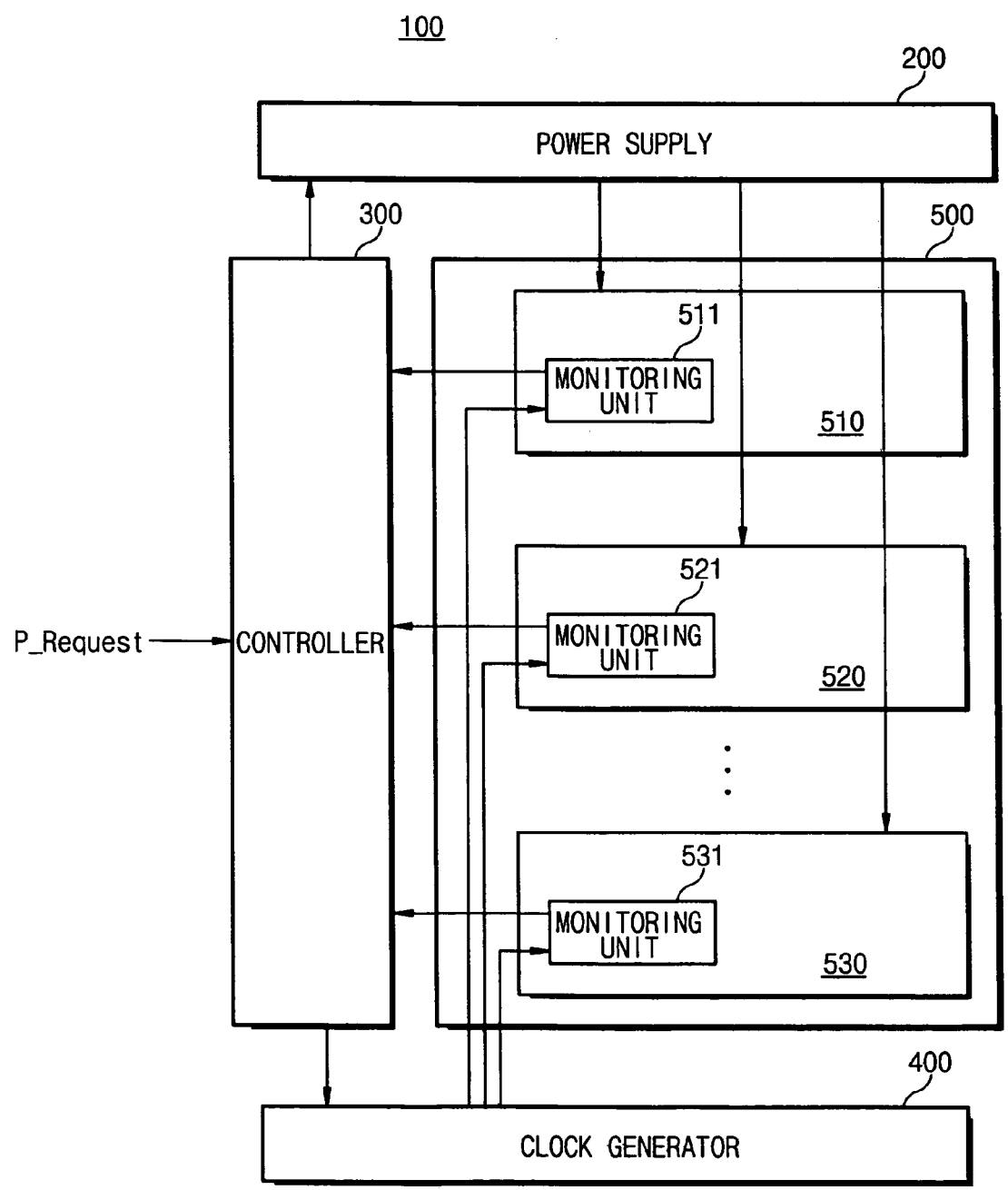
FIG. 2 is a block diagram of a system-on-chip according to another example embodiment of the present invention.

FIG. 2 is a block diagram of a system-on-chip according to another example embodiment of the present invention. The system-on-chip 100 of FIG. 2 may be similar or substantially similar to the system-on-chip of FIG. 1, except that the power domains 600, 700 and 800 may be omitted. As shown, the system-on-chip 100 may include a power supply 200, a controller 300, a clock generator 400 and/or an IP block 500 having a plurality of the power domains 510, 520 and 530.

In the power domains 510, 520 and 530 of the IP block 500, one power domain may include modules and/or sub-blocks with similar or substantially similar operating frequencies among a plurality of modules (not shown) and/or sub-blocks with different performances and/or operating frequencies. The power domains 510, 520 and 530 of the IP block 500 may include monitoring units 511, 521 and 531, respectively.

The power supply 200, the controller 300, the clock generator 400 and/or the monitoring units 511, 521, and 531 may operate in the same or substantially the same manner as the counterparts illustrated in FIG. 1, which are indicated by the same reference numerals.

Figure 3:
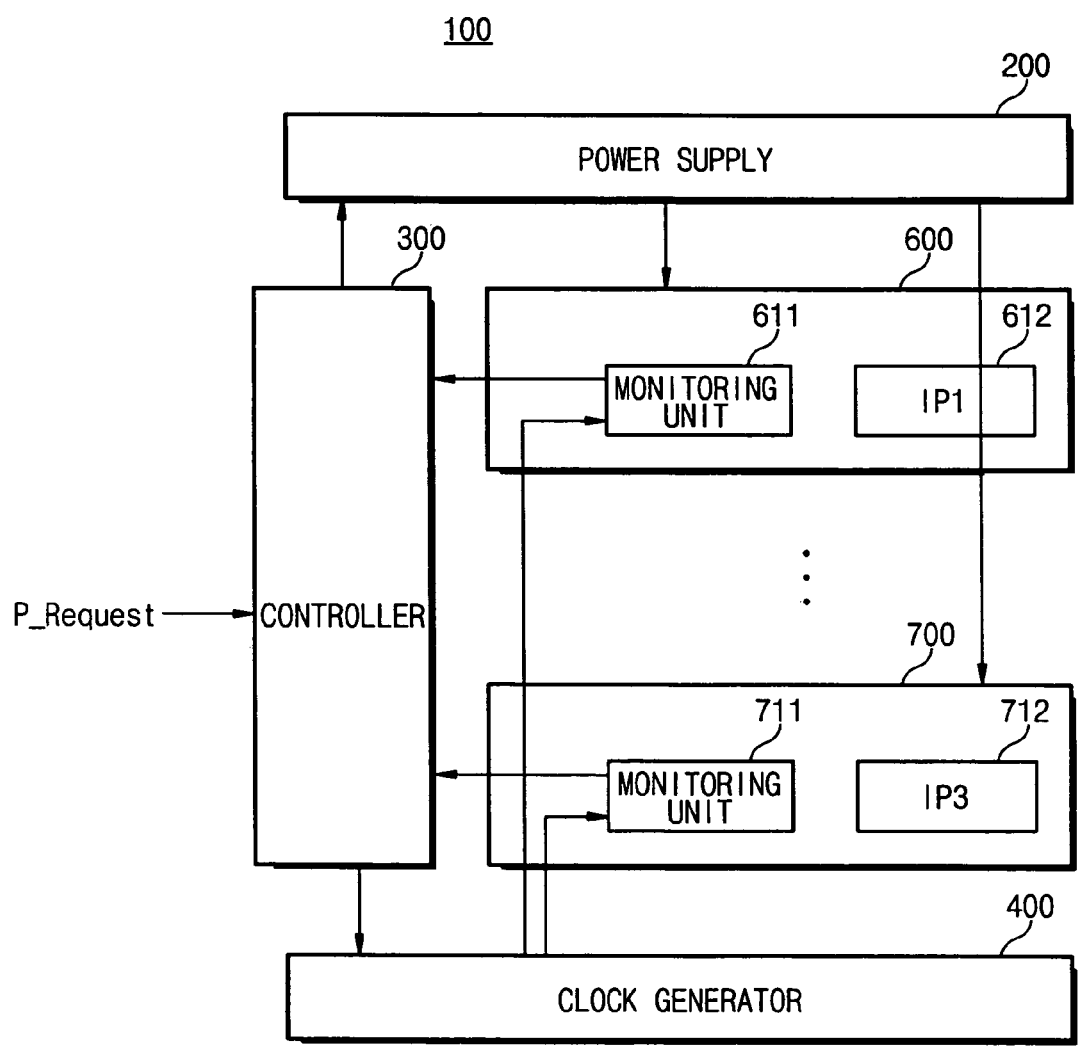
FIG. 3 is a block diagram of a system-on-chip according to another example embodiment of the present invention.

FIG. 3 is a block diagram of a system-on-chip according to another example embodiment of the present invention. The system-on-chip 100 of FIG. 3 may be the same or substantially the same as the system-on-chip of FIG. 1, except that the IP block 500 and the power domain 800 may be omitted. As shown, the system-on-chip 100 may include a power supply 200, a controller 300, a clock generator 400 and/or power domains 600 and 700.

The power domain 600 may include an IP block 612 having a plurality of modules (not shown) with similar or substantially similar performances and/or operating frequencies, and the power domain 700 may include an IP block 712 having a plurality of modules (not shown) having similar or substantially similar performances and/or operating frequencies. The power domains 600 and 700 may include monitoring units 611 and 711, respectively.

The power supply 200, the controller 300, the clock generator 400 and/or the monitoring units 611 and 711 may operate in the same or substantially the same manner as the counterparts of FIG. 1, which are indicated by the same reference numerals.

Figure 4:
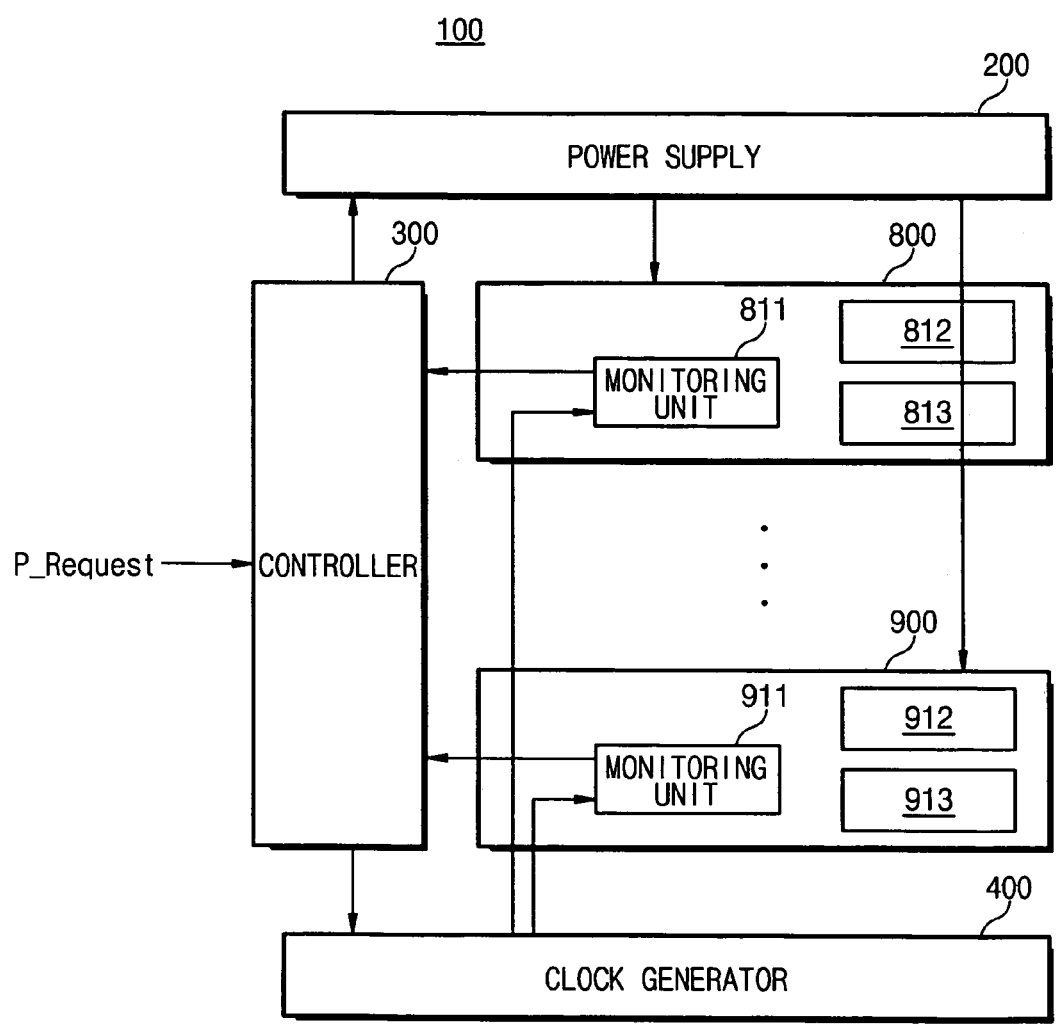
FIG. 4 is a block diagram of a system-on-chip according to another example embodiment of the present invention.

FIG. 4 is a block diagram of a system-on-chip according to another example embodiment of the present invention.

The system-on-chip 100 of FIG. 4 may be similar or substantially similar to the system-on-chip of FIG. 1, except that the IP block 500 and the power domains 600 and 700 may be omitted. As shown, the system-on-chip 100 may include a power supply 200, a controller 300, a clock generator 400 and/or power domains 800 and 900.

In the IP blocks of the power domains 800 and 900, the power domain 800 may include a plurality of IP blocks 812 and 813 with similar or substantially similar performances and/or operating frequencies, and the power domain 900 may include a plurality of IP blocks 912 and 913. The power domains 800 and 900 may include monitoring units 811 and 911, respectively. The IP blocks 812 and 813 and the IP blocks 912 and 913 may have different performances and/or operating frequencies.

The power supply 200, the controller 300, the clock generator 400 and/or the monitoring unit 811 may operate in the same or substantially the same manner as the counterparts of FIG. 1, which are indicated by the same reference numerals.

Although two IP blocks may be included in each of the power domains 800 and 900 of FIG. 4, three or more IP blocks may also be included.

According to one or more example embodiments of the present invention, performance of the IP blocks or modules with lower performances and/or operating frequencies may be improved and/or power consumption of the IP blocks and/or modules with higher performance may be reduced.

It will be apparent to those skilled in the art that various modifications and variations may be made to example embodiments of the present invention as described herein. The present invention covers the modifications and variations of this invention provided they come within the scope of the appended claims and their equivalents.

What is claimed is:

1. A system-on-chip comprising:
   a plurality of power domains, each of the plurality of power domains having a different operating frequency and including a monitoring unit for monitoring an operating status of a corresponding one of the plurality of power domains;
   a power supply for supplying power to the plurality of power domains;
   a clock generator for outputting a reference clock to each of the monitoring units; and
   a controller for setting a target operating frequency in response to a target set signal, controlling the clock generator to generate and output a reference clock corresponding to the target operating frequency, generating a control signal to adjust voltage levels of the power domains to the power supply based on operating status information received from each of the monitoring units.

2. The system-on-chip of claim 1, wherein each of the plurality of power domains further includes at least one sub-block, and the operating status is an operating status of the at least one sub-block.

3. The system-on-chip of claim 2, wherein the at least one sub-block includes at least one module or IP block.

4. The system-on-chip of claim 2, wherein each monitoring unit generates operating status information by comparing a frequency of the reference clock with an operating frequency of a corresponding one of the at least one sub-blocks.

5. The system-on-chip of claim 1, wherein the control signal is indicative of a voltage level selected by the controller based on the received operating status information.

6. The system-on-chip of claim 5, wherein the power supply supplies each of the power domains with power according to the voltage level selected by the controller.

7. The system-on-chip of claim 1, wherein at least a portion of the plurality of power domains are included in at least one IP block, each of the plurality of power domains includes at least one module, and the operating status information is operating status information associated with the at least one module.

8. The system-on-chip of claim 7, wherein each monitoring unit generates operating status information by comparing a frequency of the reference clock with an operating frequency of a corresponding one of the at least one modules.

9. The system-on-chip of claim 7, wherein the control signal is indicative of a voltage level selected by the controller based on the operating status information.

10. The system-on-chip of claim 9, wherein the power supply supplies the power domains with power according to the voltage level selected by the controller.

11. The system-on-chip of claim 1, wherein each of the plurality of power domains includes at least one IP block and the operating status information is operating status information associated with the at least one IP block.

12. The system-on-chip of claim 11, wherein each monitoring unit generates operating status information by comparing a frequency of the reference clock with an operating frequency of a corresponding one of the at least one IP blocks.

13. The system-on-chip of claim 12, wherein the control signal is indicative of a voltage level selected by the controller based on the operating status information.

14. The system-on-chip of claim 13, wherein the power supply supplies each of the power domains with power based on the voltage level selected by the controller.

15. The system-on-chip of claim 1, wherein,
   a first portion of the plurality of power domains are included in at least one IP block and each monitoring unit monitors an operating status of a corresponding sub-block,
   each power domain in a second portion of the plurality of power domains includes at least one IP block and each monitoring unit monitors an operating status of a corresponding one of the at least one IP blocks, and
   the controller generates a control signal based on at least one of operating status information for at least one sub-block or at least one IP block.

16. The system-on-chip of claim 15, wherein each power domain in the first portion includes a monitoring unit and corresponding at least one sub-block, and each power domain in the second portion includes a monitoring unit and at least one IP block.

17. The system-on-chip of claim 15, wherein the sub-block includes at least one module.

18. The system-on-chip of claim 15, wherein each monitoring unit generates operating status information by comparing a frequency of the reference clock with an operating frequency of the sub-block or IP block.

19. The system-on-chip of claim 15, wherein the control signal is indicative of a voltage level selected by the controller based on the operating status information.

20. The system-on-chip of claim 19, wherein the power supply supplies each of the power domains with power based on the voltage level selected by the controller.

21. A method of adjusting a voltage level, comprising:
   generating a reference clock based on a target operating frequency;

comparing a frequency of the reference clock with an operating frequency of at least one IP block or at least one sub-block to generate a comparison result;
selecting a voltage level based on the comparison result;
supplying each of a plurality of power domains with power based on the selected voltage level; and
determining whether power supplied to the power domain has an appropriate voltage level.

22. The method of claim 21, further including,
repeating the comparing, the selecting and the supplying when the supplied power has an inappropriate voltage level.

23. A system-on-chip for performing the method of claim 21, the system-on-chip comprising:

a plurality of power domains, each including a monitoring unit for comparing a frequency of the reference clock with an operating frequency of at least one IP block or at least one sub-block to generate a comparison result;
a power supply for supplying each power domain with power based on the selected voltage level;
a clock generator generating a reference clock based on the target operating frequency; and
a controller for selecting a voltage level based on the comparison result, and determining whether power supplied to the power domain has an appropriate voltage level.

* * * * *